United States Patent [19]

Schmid

[11] Patent Number: 5,223,984
[45] Date of Patent: Jun. 29, 1993

[54] HAIR GROOMING MIRROR APPARATUS

[76] Inventor: Ferdinand Schmid, 1205 Maple St., Santa Monica, Calif. 90405

[21] Appl. No.: 873,115

[22] Filed: Apr. 24, 1992

[51] Int. Cl.⁵ ............................................. G02B 7/18
[52] U.S. Cl. .................................... 359/855; 359/881; 248/489; 248/493
[58] Field of Search ............... 359/850, 855, 871, 881; 248/469, 470, 489, 493

[56] References Cited

U.S. PATENT DOCUMENTS

| | | | |
|---|---|---|---|
| 1,763,550 | 6/1930 | Beauchamp | 359/855 |
| 3,429,051 | 2/1969 | Lutz et al. | 359/850 |
| 4,004,850 | 1/1977 | Nelson | 359/881 |
| 4,487,479 | 12/1984 | Tolomeo, Sr. | 359/881 |

Primary Examiner—Bruce Y. Arnold
Assistant Examiner—J. Ryan
Attorney, Agent, or Firm—Robert Schaap

[57] ABSTRACT

The hair grooming mirror apparatus comprised of a mounting assembly for securement of the mirror apparatus to a ceiling or other overhead structure. A mirror frame is suspended from and carried by the mirror assembly such that it can be raised and lowered with respect to the mounting assembly. A mechanism similar to a mechanism used in louvered blinds of the kind which can be raised and lowered vertically is also employed in the mirror apparatus of the present invention. The mirror frame carries a pair of mirror panels which are angulated with respect to one another at an angle which is preferably an obtuse angle. In accordance with this mirror apparatus, a user can first comb a front portion of his or her hair by looking into a fixed supported mirror. The user can then lower the mirror frame and position the pair of mirror panels in front of the user and look into the mirror panels then positioned in front of the user. The fixedly mounted mirror will be able to reflect the light images of the rear portion and even a section of the upper portion of the user's head to the mirror panels of the invention thereby enabling the user to effectively observe and comb or otherwise groom the rear and upper portions of his or her hair.

20 Claims, 4 Drawing Sheets

HAIR GROOMING MIRROR APPARATUS

BACKGROUND OF THE INVENTION

1. Field of the Invention:

This invention relates in general to certain new and useful improvements in hair grooming mirror apparatus and, more particularly, to an apparatus which includes a pair of mirror panels which can be selectively positioned with respect to the height of the user enabling a user to examine the rear and upper portions of the user's head by an image projected from a fixed rearwardly located mirror to the mirror panels of the invention.

2. Brief Description of the Prior Art:

One of the problems frequently encountered by both men and women in the grooming of their hair is the lack of ability to see the rear side of their head and thus, the way in which they may be grooming their hair. In many cases, the body attempting to comb, brush, or otherwise groom, his or her hair attempts to use a small hand-held mirror which may be positioned behind the head or slightly to the side of the user's head. In this way, the user can attempt to observe an image reflected from a hand-held mirror into a main wall-mounted mirror in front of the user. This system of attempting to comb one's hair is obviously time-consuming and usually ineffectual. It is exceedingly difficult for a party to use one hand for purposes of positioning a mirror behind his or her head and the other hand to brush or comb or otherwise groom his or her hair.

It may be appreciated that if the user of a hand-held mirror attempts to position that mirror behind his or her head, he or she cannot hold the mirror in a fixed position. As a result, the user does not observe a constant image. Furthermore, many users require both hands in order to groom their hair and the holding of a mirror device clearly interferes with their ability to properly groom their hair.

Some bathrooms or dressing rooms are provided with a three-way mirror system. In fact, many three-way mirror systems were incorporated into dressers, dressing tables and the like, particularly during the Art Deco furniture manufacturing period in the United States. Nevertheless, with the three-way mirror systems which may be found in bathrooms and dressing rooms, a large mirror is positioned in the center with two smaller mirrors hingedly mounted to the vertical edges of the large mirror on opposite sides thereof. The two smaller mirrors are adapted to be turned at angles relative to the main large mirror. Even if the side mirrors are of a large size, they can only produce a view in the main front mirror of the sides of the user's head. There is little facility in this type of mirror system for enabling the user to observe the rear portion of his or her head.

In addition to the foregoing, users of this three-way mirror system are required to continually adjust the mirrors to position the same at precisely the correct angle in order to observe even the side portions of their head. Furthermore, it is virtually impossible to see the top of their head using this three-way mirror system. One attempting to groom his or her hair may tilt his head downwardly slightly in order to attempt to observe the top portion of the head. However, the resultant effect is that the user typically ends up looking at the floor as opposed to the top of his or her head.

The present invention obviates these and other problems in the provision of a mirror system in which a pair of angularly located mirrors can be located in front of the user and possibly slightly above the user's head, as may be desired for receiving reflected images of the top or back of the user's head from a fixedly mounted mirror.

OBJECTS OF THE INVENTION

It is, therefore, one of the primary objects of the present invention to provide a hair grooming mirror apparatus in which a pair of mirrors are angularly located relatively to one another and are capable of being adjustably positioned by a user to observe the rear or top of the user's head.

It is another object of the present invention to provide a hair grooming mirror apparatus of the type stated in which a pair of adjustably positionable cooperating angularly located mirrors are used in conjunction with a main wall-mounted mirror or stationary mirror for enabling a reflected image of the back or top of the user's head to be projected into the mirror apparatus of the invention.

It is a further object of the present invention to provide a hair grooming mirror apparatus of the type stated which can be releasably mounted within a person's bathroom or dressing room or other facility in a person's residence and which can be removable therefrom for use on a portable stand.

It is a additional object of the present invention to provide a hair grooming mirror apparatus of the type stated which is constructed at a relatively low cost and which is highly effective in use and in operation.

It is another salient object of the present invention to provide a method of enabling one to groom his or her hair by using adjustably positionable mirrors.

With the above and other objects in view, my invention resides in the novel features of form, construction, arrangement and combination of parts presently described and pointed out in the claims.

BRIEF SUMMARY OF THE DISCLOSURE

The present invention relates in general terms to a hair grooming mirror apparatus and method of utilizing the same for purposes of enabling a user to groom the rear and top portions of his or her hair. Further, the apparatus may be provided in several embodiments, although the most the most salient embodiments utilize a pair of mirrors which are angularly located relative to one another and are positionable at a desired height relative to a user.

The mirror apparatus of the invention comprises a mounting and supporting structure for holding and supporting a frame containing a pair of angularly located mirrors. In a preferred embodiment, the mirrors may be positioned at an angle of about 155 degrees relative to one another although this angle may vary from about 175 degrees to about 130 degrees. The mirror frame is supported in a suspended position from the main mounting and supporting structure by a plurality of cables or cords. The cables or cords are connected to this mounting and supporting structure through a mechanism which enables raising and lowering of the cords and hence, the mirror frame.

A drawstring is connected to this raising and lowering mechanism. This enables a raising of the mirror frame when the drawstring is pulled and a lowering of the mirror frame when the drawstring is raised, much in the same manner as with venetian blinds or louvered blinds.

In accordance with this construction, it can be seen that the user of the mirror apparatus can raise and lower the mirror frame to a desired height merely by pulling on or releasing the draw-cable or draw-cord. Furthermore, with the mirrors being located at an angular relationship relative to one another, they are readily positionable with respect to both the front and the front side portions of the user's head which are almost always totally obscured from view by a user. In addition, by raising and lowering the mirror frame, it is possible for the user to observe the top of the user's head for purposes of grooming the user's hair. The images generated in a fixedly mounted mirror are reflected essentially forwardly to the mirror panels of the invention in front of which the user positions himself or herself. In this way, the user only has to look straight ahead and utilizing the mirror apparatus of the invention can easily and readily groom the rear and top portions of his or her hair.

The mirror frame containing the angulated pair of mirrors can be removed from the mounting and supporting structure for purposes of use elsewhere as, for example, on a trip or the like. A portable stand, such as a tripod stand, can be used for supporting the mirror frame with the attendant angularly located mirror panels. While the tripod-type portable stand is not as easily useable as is the mirror apparatus, when on the mirror frame mounting and supporting structure, the mirror frame can nevertheless be used and can be raised or lowered to a desired height through the portable stand. Moreover, it can be held in a position behind or in front of or slightly above, or even below a user's head much in the same manner as when suspended from the mounting and supporting structure.

This invention has many other purposes and other advantages which will be made more fully apparent from a consideration of the forms in which it may be embodied. One of these forms of the unique and novel hair grooming mirror apparatus and the method of using same is more fully described in the following detailed description and more fully illustrated in the accompanying drawings. However, it is to be understood that this detailed description and the accompanying drawings are only for purposes of illustrating and describing the general principals of the invention and they are not to be taken in a limiting sense.

BRIEF DESCRIPTION OF THE DRAWINGS

FIG. 12 is a top plan view of the use of the mirror frame on a portable stand;

DETAILED DESCRIPTION OF PREFERRED EMBODIMENTS

Figure 1:
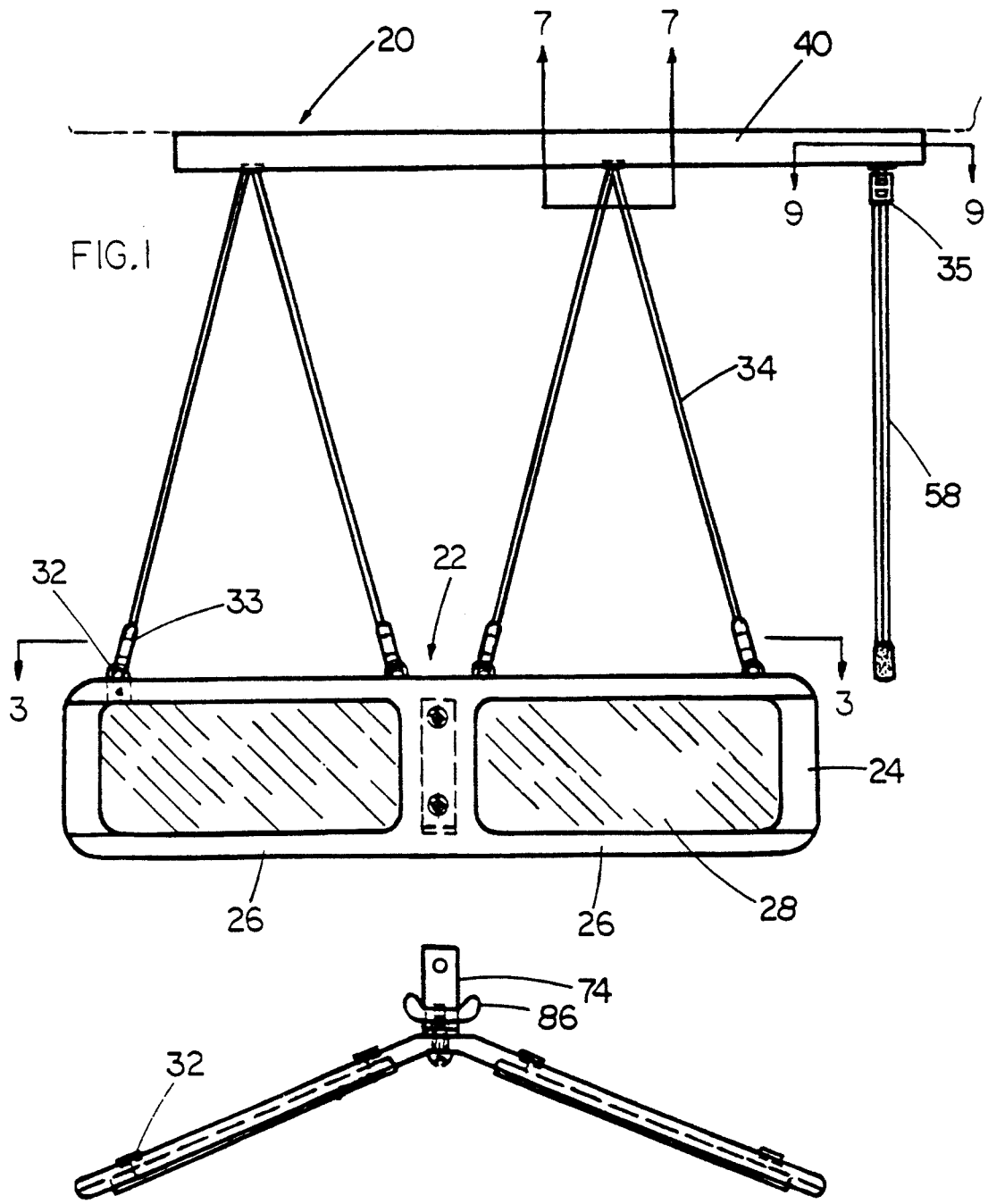
FIG. 1 is a front elevational view of a hair grooming mirror apparatus constructed in accordance with and embodying the present invention when in a lowered or user position.

Referring now in more detail and by reference characters to the drawings which illustrate several practical embodiments of the invention, A designates a hair grooming mirror apparatus which is generally comprised of a mounting and supporting mechanism 20 which is adapted to support a mirror assembly 22.

Figure 2:
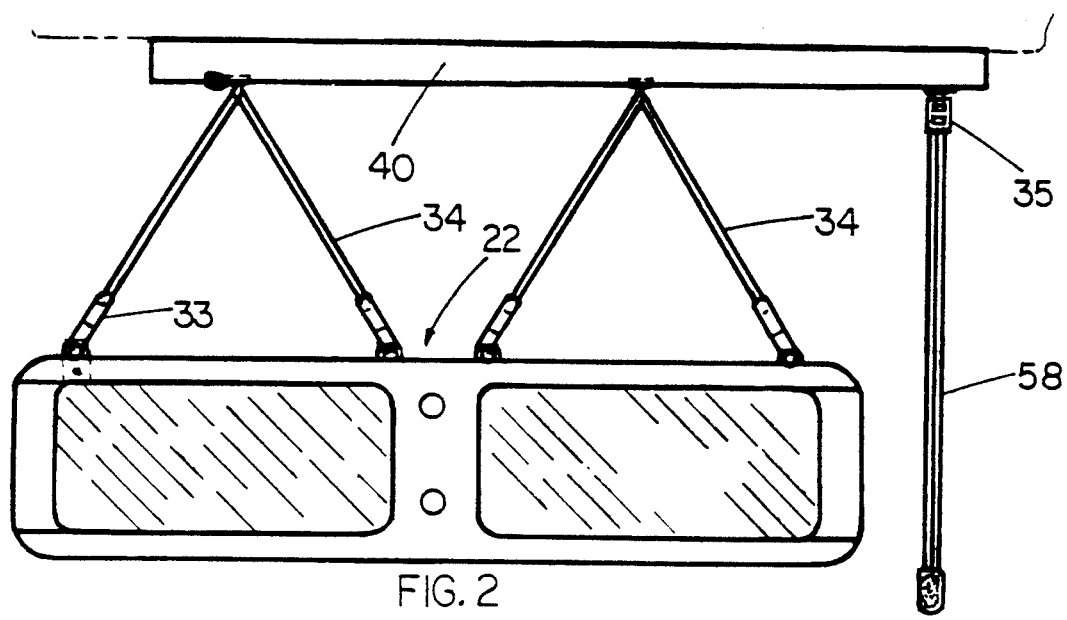
FIG. 2 is a front elevational view of the mirror apparatus of FIG. 1 showing a mirror frame and accompanying mirror panels in a raised position.
Figure 3:
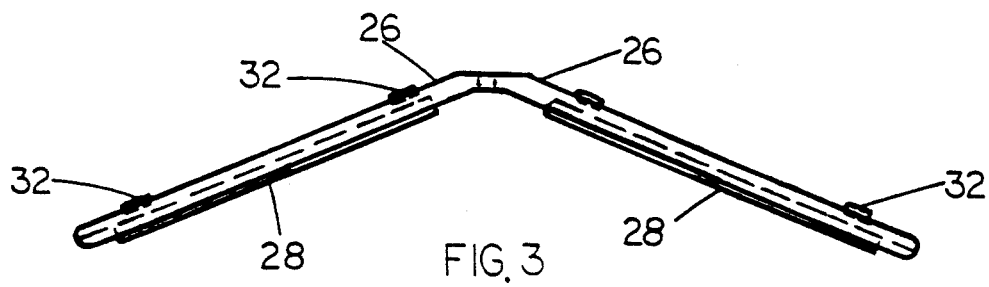
FIG. 3 is a top plan view of the mirror frame forming part of the hair grooming mirror apparatus of the invention.

The mirror assembly 22 is more fully illustrated in FIGS. 1-3 of the drawings and generally comprises a mirror frame 24, having a pair of angulated frame sections 25, which are angulated with respect to one another at an angle of about 155 degrees with respect to one another and which may range from 130 degrees to about 175 degrees, with respect to one another.

Suitably inserted into grooves 26 on each of the mirror frame sections 25 and mounted therein is a mirror panel 28 and which mirror panels are also located with respect to one another in about the same angular relationship as the mirror frame sections 26 are located with respect to one another. Also mounted on the upper end of each of the frame sections 26 is a pair of eyelets 32 for receiving and connecting to spring loaded clips 33 at the lower ends of draw-cords 34. These draw cords 34 are connected to the supporting mechanism 20 for raising and lowering the mirror frame in a manner to be hereinafter described in more detail.

The mounting and supporting mechanism 20 is more fully illustrated in FIGS. 4-10 of the drawings, and comprises an outer housing 40 which is generally rectangular in shape and which houses the mechanism for raising and lower the mirror assembly 22. To a large extent, this mechanism, which is used to raise and lower the mirror assembly, is conventional and is similar to a mechanism used for raising and lowering draw blinds. To the extent that there may be a deviation from this conventional construction, the mechanism of the present invention is hereinafter illustrated and described in more detail.

Located within the lower end of the housing 40 in, shiftable arrangement with respect thereto, is a pair of slides 2. By reference to FIG. 4, it can be observed that the slides 42 are flat plates and located in a generally horizontal disposition and each have an opening 44 for receiving a draw cord 34. The openings 44 may suitably be provided with a grommet or bearing ring 46 to preclude fraying of the cord 34 as it passes therethrough. A clip 48 is secured to the free portion of the draw-cords 34 at the right-hand end of the housing 40, reference being made to FIG. 1, for controlling the lowermost limit of movement of the frame 24. This clip can be adjustably positioned on the free hand engagable portions of the draw-cords 34 to control the lowermost limit of movement of the frame 24.

Figure 4:
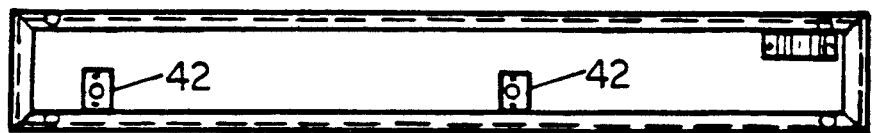
FIG. 4 is a top plan view of the mounting and supporting structure forming part of the mirror apparatus of the present invention.
Figure 5:
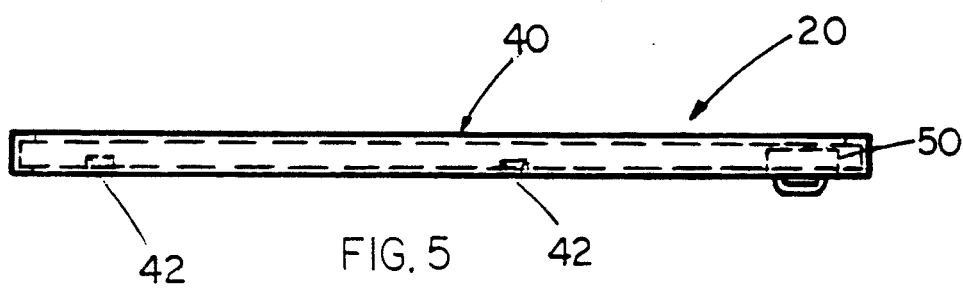
FIG. 5 is a side elevational view of the mounting and supporting structure forming part of the mirror apparatus of the invention.
Figure 6:
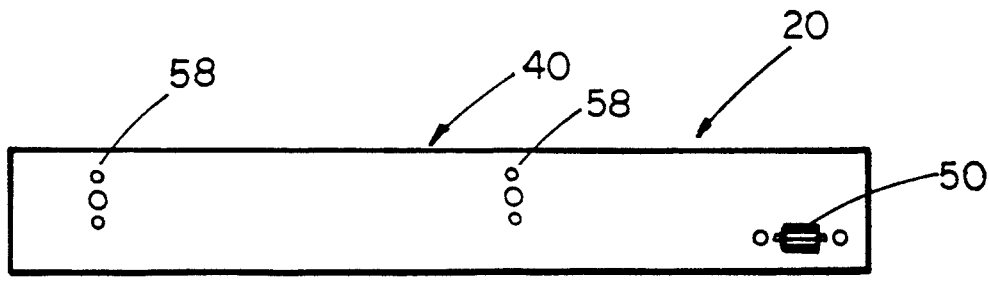
FIG. 6 is a bottom plan view of the mounting and supporting structure forming part of the mirror apparatus of the present invention.
Figure 7:
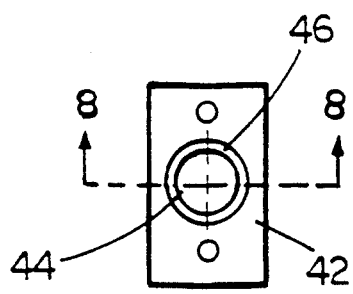
FIG. 7 is a side elevational view of a slide which is used in conjunction with a cable guide which is used in the mounting and supporting structure forming part of the mirror apparatus of the present invention.
Figure 8:
FIG. 8 is a sectional view taken along line 8—8 of FIG. 7.
Figure 9:
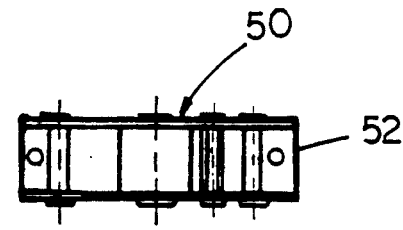
FIG. 9 is a top plan view of a cable pulling and release mechanism forming part of the supporting and mounting structure.
Figure 10:
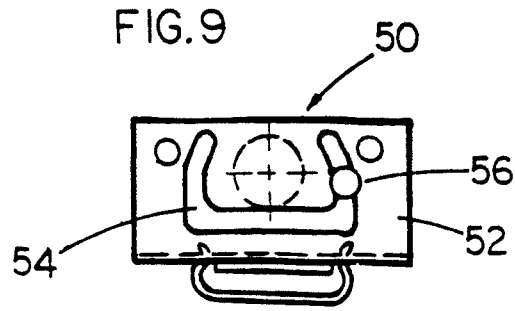
FIG. 10 is a front elevational view of the cable pulling and release mechanism of FIG. 9.

Mounted in the right-hand end of the housing 40, reference being made to FIGS. 4-6 of the drawings, is a raising and lowering assembly 50, and which is more fully illustrated in FIGS. 8, 9 and 10 of the drawings. This mirror raising and lowering assembly comprises a cord lock 52 having a somewhat U-shaped slot 54 formed therein. A locking pin 56 is moveable in the U-shaped slot 54. When this locking pin 56 is on one side of the U-shaped slot 54, it will permit a raising and lowering of the cord. In like manner, when it is shifted to the opposite side of the slot, it will lock, thereby holding the mirror assembly in a fixed position when the pin 56 is moved to the opposite side of the slot.

In accordance with the above outlined construction, if the user of the apparatus pulls to the right (FIG. 10) on a draw-cord section 58, which is connected to the cords 34, the user will cause a shifting of the pin 54 to the right-hand side of the slot 54. When the user pulls the draw-cords 58 to the opposite or left-hand side, he or she will then effectively pull the pin 56 to the opposite side of the slot 54. Thus, in one position, the pin will permit a raising and lowering of the cord 34 and, in the opposite position, it will lock the cord in that fixed position.

The housing 40 is also suitably provided with fastener-receiving openings 58 for mounting to a ceiling or other supporting structure. However, it should be understood that any conventional means could be used for securing the housing 40 to a support structure as, for example, a ceiling or the like.

The housing itself may be constructed of light weight metals or, for that matter, plastic materials. The same holds true for the frame of the mirror assembly. It is desirable to use relatively thin-gauged metals so as to obtain a relatively light weight for the overall apparatus.

The hair grooming mirror assembly of the invention is highly effective in enabling a user to groom his or her hair by using the mirror assembly in combination with a fixed mirror. One such arrangement which can employ a fixed mirror while utilizing the mirror assembly of the present invention, is more fully illustrated in FIG. 11 of the drawings. By further reference to FIG. 11, it can be seen that the mirror assembly 22 is positioned with respect to, and approximately within about the same plane as, a fixed mirror 60.

Figure 11:
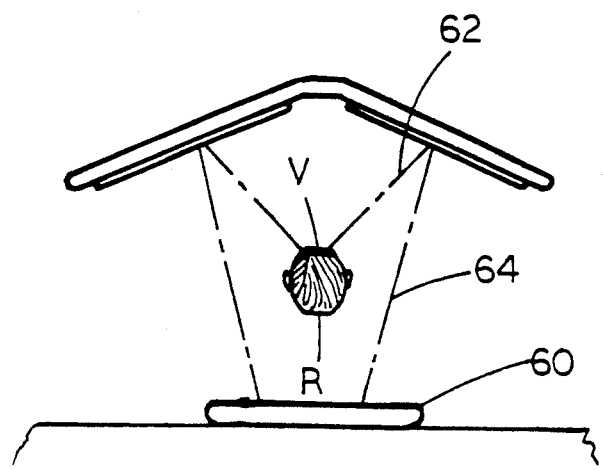
FIG. 11 is a schematic top plan view showing the reflected image arrangement using the mirror apparatus of the present invention with respect to a user thereof.

When a user of the assembly stands between the mirror assembly 22 and the fixed mirror 60, as indicated in FIG. 11, the viewer will literally be able to examine the hair on the back and sides of his or her head. For example, the rear portion of the head, designated as R in FIG. 11, creates an image in the mirror 60 along the path of the lines 62 and 64. The view along the line 62 will be reflected from the mirror 60 to the mirror panels 28. Thus, when the front of the head F of a user looks into the mirror panels 28, that user can readily see the rear portion of his or her head. In like manner, since the mirror panels 28 are angulated relative to one another, the user of the apparatus will also be able to examine the side portions of his or her head and, which again, are often not visible when using a single plane mirror.

By vertically positioning the mirror assembly 62, it can also be seen that the user will be able to examine the hair condition on the top portion of his or her head, as well. By raising the mirror assembly slightly, the image from the top of the head will be reflected to the panels 28 from the fixed mirror 60. When an individual starts to groom his or her hair, they normally would start by using the fixed mirror 60 conventionally provided in most bathrooms and dressing rooms. After they groom the front part of their hair, this individual can turn around and lower the mirror frame assembly by releasing the cords and pulling the cords to the left. This will disengage the locking mechanism, allowing the mirror assembly to lower to the desirable height. In this way, the user can then observe both of the sides and the back of his or her head in the panels 28 by the reflection from the large stationary or fixed mirror 60.

It has been found in connection with the present invention that a desirable distance from the front of the user's head and the mirror assembly ranges from about 24 to 40 inches, and preferably, about 30 inches, although this distance can be varied in accordance with individual preference. When the user of the assembly has finished with the mirror assembly, he or she can merely pull on the draw cords thereby raising the mirror assembly to a position where it is out of the way.

If desired, each of the mirror panels 28 could have specially built-in magnifying glass panels. In some cases, where intricate hair arrangements are employed, these magnifying lenses might be desirable. For that matter, other types of lenses or mirrors could be incorporated in the mirror panels 28 or used in place thereof.

It should be understood that the mirror assembly 22 could be provided with an electrical motor with a manually actuable control switch for raising and lowering the mirror frame and hence, the mirror panels carried thereby. In like manner, if desired, the electrical motor could be operated in conjunction with a control circuit from a remote control unit. In this way, the draw-cords can be completely eliminated. However, belts would be required in place of the draw-cords to suspend from the housing 40 to the mirror assembly 22. In like manner, and by using properly located drive belts, it is also possible to pitch the angle of the mirror relative to the user so that the mirror assembly can be tilted forwardly or backwardly in order to achieve other viewing angles.

For purposes of travel or storage, the mirror frame could be constructed so that the two frame sections 26, can be shifted relative to one another. In this way, one frame section can be folded to lie in facewise disposition with the other frame section 26.

Figures 13, 14:
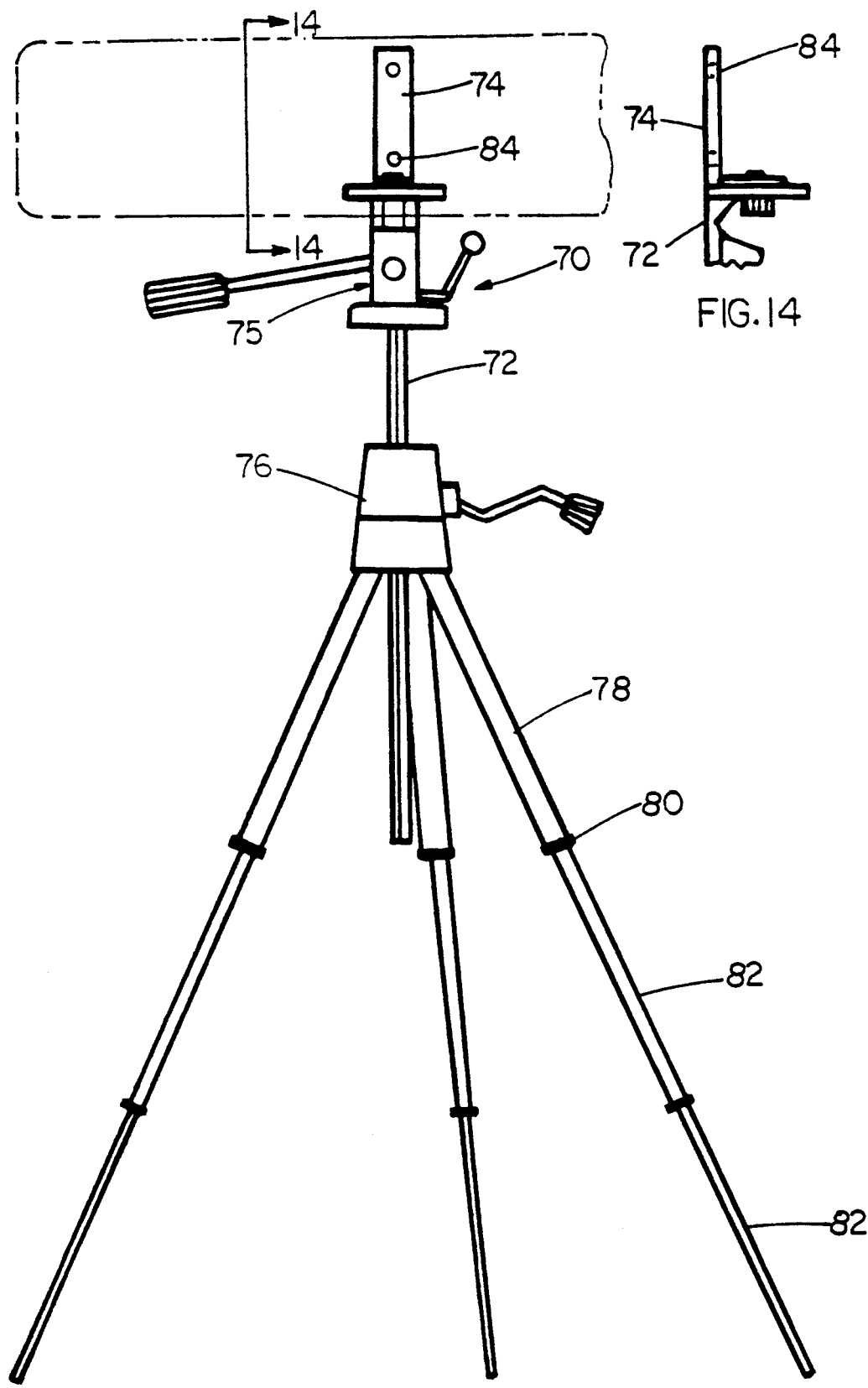
FIG. 13 is a front elevational view of a portable stand which can be used for supporting the mirror frame of the present invention.
FIG. 14 is a fragmentary side elevational view taken along line 14—14 of FIG. 13.

The mirror assembly 22 can also be removed from the mounting and supporting mechanism 20 for purposes of using the same in another location. For this purpose, a portable stand 70 may be provided, as best illustrated in FIG. 12-14 of the drawings. This stand 70 is comprised of an elongate vertically disposed leg 72 having a mounting and receiving bracket 74 at its upper end, and which is hereinafter described in more detail. At its lower end, the leg 72 is provided with a base 76 suitably supporting tripod legs 78. These tripod legs 78 are provided with knurled locking nuts 80 for permitting telescopic extensions 82 to extend therefrom and to be retracted therein. By adjusting the length of the telescopic extensions 82 with respect to the tripod legs 78 it is possible to achieve a desired height using the stand 70.

The base 76 suitably retains the tripod legs 78 so that the latter may be pivoted with respect to the base 76.

A mounting and supporting bracket 74 is mounted on the upper end of a conventional adjusting mechanism 75, which is, in turn, on the upper end of the leg 70. This bracket 74 is generally L-shaped, as best illustrated in FIG. 14 and is also provided with a pair of mounting holes 84. In this way, the mirror assembly 22 can be releasably secured to the mounting and supporting bracket with screws and lock nut fasteners 86, as best shown in FIGS. 12 and 13. Thus, the mirror assembly can be releasably attached to the stand for temporary use thereon, or it can be used in connection with the mounting and supporting mechanism 20, as previously described.

Thus, there has been illustrated and described a unique and novel hair grooming mirror apparatus which permits a user to examine the condition of the user's hair on the side and back, as well as the top portions of the user's hair. This mirror assembly thereby fulfills all of the objects and advantages which have been sought therefor. It should be understood that many changes, modifications, variation and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A hair grooming mirror apparatus enabling a user to view a rear portion and a top portion of a user's head in combination with a fixed mirror to permit a user to groom the hair on the rear or top portion of the user's head, said mirror apparatus comprising:
   a) a frame,
   b) a pair of mirror sections on said frame and which are angulated relative to one another and which cooperate with a fixed mirror on an opposite side of the head of the user with respect to the frame, said pair of mirror sections being angulated at a desired obtuse angle relative to one another and being spaced from one another at a desired distance and also being spaced from the fixed mirror by a desired distance so that the mirror panels in combination with the fixed mirror allow views of the rear side of the head of a user to be reflected from one of the mirror sections or the fixed mirror to the other, enabling the user to observe both the front and the rear of the user's head in a single mirror,
   c) means associated with said frame for enabling a raising and lowering of the frame with respect to the fixed mirror to permit the user to observe a portion of the top or rear of the user's head in the mirror that receives the reflected image.

2. The hair grooming mirror apparatus of claim 1 further characterized in that the frame has sections which are angulated to one another to cause mirror panels carried by these frame sections to be angulated relative to one another.

3. The hair grooming mirror apparatus of claim 1 further characterized in that the means for raising and lowering comprises cables connected to the frame to pull the frame upwardly and allow the frame to drop.

4. The hair grooming mirror apparatus of claim 3 further characterized in that the means for raising and lowering also comprises an overhead mounting and supporting mechanism and the cables are connected to the frame and the mounting and supporting mechanism.

5. The hair grooming mirror apparatus of claim 3 further characterized in that mounting means is provided on said frame for releasably securing the frame to a self-standing portable support.

6. A hair grooming mirror apparatus enabling a user to view a rear portion of a user's head in combination with a fixed mirror to permit a user to groom the hair on the rear or top portion of the user's head, said mirror apparatus comprising:
   a) a frame,
   b) a pair of mirror sections on said frame and which are angulated relative to one another and which cooperate with a fixed mirror on an opposite side of the head of the user with respect to the frame, said pair of mirror sections being angulated at a desired obtuse angle relative to one another and being spaced from one another at a desired distance and also being spaced from the fixed mirror by a desired distance so that the mirror panels in combination with the fixed mirror allow views of the rear side of the head of a user to be reflected from one of the mirror sections or the fixed mirror to the other, enabling the user to observe both the front and the rear of the user's head in a single mirror,
   c) means for supporting the frame so that the mirror frame can be positioned at a proper height with respect to the head of a user, and
   d) mounting means on said frame for releasably mounting the frame and the mirror sections carried thereby to a shelf-standing portable support.

7. The hair grooming mirror apparatus of claim 6 further characterized in that the frame has sections which are angulated to one another to cause mirror panels carried by these frame sections to be angulated relative to one another.

8. The hair grooming mirror apparatus of claim 6 further characterized in that said apparatus enables a user to observe a top portion of a head of the user, and that the means for supporting is a means for suspending which also enables and raising and lowering of the frame to enable the mirror sections to be positioned at a desired height with respect to a user.

9. The hair grooming mirror apparatus of claim 8 further characterized in that the means for suspending also constitutes a mechanism for raising and lowering and which comprises an overhead mounting and supporting device with cables connected between the frame and the mounting and supporting device.

10. A hair grooming mirror apparatus enabling a user to view a rear portion and a top portion of a user's head in combination with a fixed mirror to permit a user to groom the hair on the rear or top portion of the user's head, said mirror apparatus comprising:
   a frame,
   a pair of mirror sections on said frame and which are angulated relative to one another at an obtuse angle and which cooperate with a fixed mirror on an opposite side of the head of the user with respect to the frame so that views of the rear side of the head of a user can be reflected from one of the mirror sections or the fixed mirror to the other, enabling the user to observe both the front and the rear of the user's head in a single mirror, and
   c) means associated with said frame for enabling a raising and lowering of the frame with respect to the fixed mirror including cables for pulling the frame upwardly and allowing the frame to drop to thereby permit the user to observe a portion of the top or rear of the user's head in the mirror that receives the reflected image.

11. The hair grooming mirror apparatus of claim 10 further characterized in that the means for raising and lowering also comprises an overhead mounting and supporting mechanism which contains the cables for connection to the frame.

12. The hair grooming mirror apparatus of claim 10 further characterized in that mounting means is provided on said frame for releasably securing the frame to a self-standing portable support.

13. A hair grooming mirror arrangement enabling a user to view a rear portion and a top portion of a user's head to permit a user to groom the hair on the rear or top portion of the user's head, said mirror arrangement comprising;
   a) a fixed mirror positioned approximately at the height of the user's face,
   b) a frame,
   c) a pair of mirror sections on said frame and which are angulated relative to one another at an obtuse angle, said mirror sections being positioned relative to the fixed mirror to cooperate with the fixed mirror and being located on an opposite side of the head of the user with respect to the fixed mirror so that views of the rear side of the head of a user can be reflected from one of the mirror sections or the fixed mirror to the other, enabling the user to observe both the front and the rear of the user's head in a single mirror, and
   d) means associated with said frame for enabling a raising and lowering of the frame with respect to the fixed mirror to permit the user to observe a portion of the top or rear of the user's head in the mirror that receives the reflected image.

14. The hair grooming mirror apparatus of claim 13 further characterized in that the frame has sections which are angulated to one another to cause mirror panels carried by these frame sections to be angulated relative to one another.

15. The hair grooming mirror apparatus of claim 13 further characterized in that the fixed mirror is mounted in a fixed position in front of the user and the frame and mirror sections are located behind the head of the user.

16. The hair grooming mirror apparatus of claim 13 further characterized in that the means for raising and lowering comprises an overhead mounting and supporting mechanism and contains cables for connection between the frame and the mounting and supporting mechanism.

17. The hair grooming mirror apparatus of claim 16 further characterized in that mounting means is provided on said frame for releasably securing the frame to a self-standing portable support.

18. A hair grooming mirror arrangement enabling a user to view a rear portion of the user's head in combination with a fixed mirror to permit a user to groom the hair on the rear or top portion of the user's head, said mirror arrangement comprising:
   a) a fixed mirror positioned approximately at the height of a user's face,
   b) a frame,
   c) a pair of mirror sections on said frame and which are angulated relative to one another at an obtuse angle, said mirror sections being positioned relative to the fixed mirror to cooperate with the fixed mirror and being located on an opposite side of the head of the user with respect to the fixed mirror so that views of the rear side of the head of a user can be reflected from one of the mirror sections or the fixed mirror to the other, enabling the user to observe both the front and the rear of the user's head in a single mirror,
   d) means for supporting the frame so that the mirror frame can be positioned at a proper height with respect to the head of a user, and
   e) mounting means on said frame for releasably mounting the frame and the mirror sections carried thereby to a shelf-standing portable support.

19. The hair grooming mirror apparatus of claim 18 further characterized in that said means for supporting is a means for suspending which also enables a raising and lowering of the frame to enable the mirror sections to be positioned at a desired height with respect to a user.

20. The hair grooming mirror apparatus of claim 19 further characterized in that the means for suspending also constitutes a mechanism for raising and lowering and which comprises an overhead mounting and supporting device with cables connected between the frame and the mounting supporting device.

* * * * *